United States Patent
Sites

(10) Patent No.: US 7,788,089 B2
(45) Date of Patent: *Aug. 31, 2010

(54) DOCUMENT BASED CHARACTER AMBIGUITY RESOLUTION

(75) Inventor: Richard L. Sites, Menlo Park, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/327,784

(22) Filed: Dec. 3, 2008

(65) Prior Publication Data

US 2009/0089060 A1 Apr. 2, 2009

Related U.S. Application Data

(63) Continuation of application No. 11/536,390, filed on Sep. 28, 2006, now Pat. No. 7,610,193, which is a continuation of application No. 11/352,617, filed on Feb. 13, 2006, now Pat. No. 7,219,052, which is a continuation of application No. 09/774,191, filed on Jan. 29, 2001, now Pat. No. 7,027,976.

(51) Int. Cl.
*G06F 17/27* (2006.01)

(52) U.S. Cl. .............................. 704/9; 704/10; 704/257; 704/251

(58) Field of Classification Search ...................... 704/9, 704/10, 3, 4, 251, 255, 257, 270; 382/138, 382/229
See application file for complete search history.

(56) References Cited

U.S. PATENT DOCUMENTS

| | | | |
|---|---|---|---|
| 4,435,778 A | 3/1984 | Cason et al. | |
| 5,208,869 A * | 5/1993 | Holt | 382/138 |
| 5,225,981 A | 7/1993 | Yokogawa | |
| 5,369,714 A | 11/1994 | Withgott et al. | |
| 5,465,309 A * | 11/1995 | Johnson | 382/229 |
| 5,606,690 A | 2/1997 | Hunter et al. | |
| 5,634,094 A | 5/1997 | Ueda | |
| 5,829,000 A | 10/1998 | Huang et al. | |
| 5,875,263 A | 2/1999 | Froessl | |
| 5,999,949 A | 12/1999 | Crandall | |

(Continued)

OTHER PUBLICATIONS

Non-Final Office Action mailed Jul. 26, 2004, U.S. Appl. No. 09/774,191, 13 pages.

(Continued)

*Primary Examiner*—Huyen X. Vo
(74) *Attorney, Agent, or Firm*—Fish & Richardson P.C.

(57) ABSTRACT

Methods and apparatus for document based ambiguous character resolution. An application searches a document for words that do not contain ambiguous characters and adds them to a dictionary, then searches the document for words that do contain ambiguous characters. For each ambiguous word, a set of candidate solutions is created by resolving the ambiguous characters in all possible ways. The dictionary is searched for words matching members of the candidate solution set. When a single member is matched, the ambiguous characters are resolved accordingly. When no member or more than one member is matched, a user is prompted to resolve the ambiguous characters. Alternatively, when more than one member is matched, the ambiguous characters are resolved to obtain the largest word, the smallest word, the most words, or the fewest words.

12 Claims, 3 Drawing Sheets

U.S. PATENT DOCUMENTS 6,011,877 A     1/2000    Ishikawa et al.
6,205,261 B1    3/2001    Goldberg
7,010,478 B2    3/2006    Mathur et al.

OTHER PUBLICATIONS

Final Office Action mailed Apr. 28, 2005, U.S. Appl. No. 09/774,191, 13 pages.

Non-Final Office Action mailed Dec. 21, 2006, U.S. Appl. No. 11/536,390, 15 pages.

Final Office Action mailed Jun. 18, 2007, U.S. Appl. No. 11/536,390, 15 pages.

Non-Final Office Action mailed Feb. 22, 2008, U.S. Appl. No. 11/536,390, 9 pages.

Non-Final Office Action mailed Feb. 20, 2009, U.S. Appl. No. 11/536,390, 5 pages..

* cited by examiner

DOCUMENT BASED CHARACTER AMBIGUITY RESOLUTION

CROSS REFERENCE TO RELATED APPLICATIONS

This application is a continuation of U.S. application Ser. No. 11/536,390, entitled "Document Based Character Ambiguity Resolution," filed on Sep. 28, 2006, which is a continuation of U.S. application Ser. No. 11/352,617, filed on Feb. 13, 2006, and issued as U.S. Pat. No. 7,219,052, which is a continuation of U.S. application Ser. No. 09/774,191, filed, on Jan. 29, 2001, and issued as U.S. Pat. No. 7,027,976. The application herein claims the benefit of priority of all of the above listed patent applications and hereby incorporates by reference in their entirety the said patent applications.

BACKGROUND

The invention relates to the field of resolving character ambiguities.

In modern offices, documents are routinely scanned into computers where they are stored as electronic images. While these images allow users to view the contents of the scanned documents, they do not allow users to manipulate the contents using standard word processing utilities. For example, users cannot find and replace a word in a scanned document stored as an electronic image. Optical character recognition algorithms attempt to recognize text occurring in scanned document images, and store the text in a formatted file that is comprehensible to a word processing algorithm. Examples of formatted files include Unicode files, and ASCII files. However, since optical character recognition algorithms are not 100% efficient, they occasionally misidentify words and characters in a scanned document, or encounter ambiguous words and characters which they cannot resolve.

One ambiguity encountered by optical character recognition algorithms is whether a hyphen occurring in a hyphenated word is a hard hyphen or soft hyphen. Hard hyphens are hyphens which belong in a word, such as the hyphens in the word daughter-in-law. Soft hyphens are hyphens which are inserted into a word by a word-processor or word-processing application for typesetting purposes only. Soft hyphens typically occur at the end of a line of text and are inserted to divide a word into two word fragments, the first of which remains on the current line of text followed by the soft hyphen, while the second begins a new line of text. Soft hyphens and hard hyphens are represented differently in formatted files. For example, soft hyphens are represented in Unicode formatted files by the hexadecimal word 00AD, while hard hyphens are represented by the hexadecimal word 002D. When an optical character recognition algorithm encounters a hyphen in a hyphenated word, it needs to identify the hyphen as either a hard hyphen or a soft hyphen so that it can store the hyphen with the appropriate code in the formatted output file. That way, a subsequent word processing application reading the formatted file can correctly interpret the hyphen to correctly display the word in which the hyphen appears.

Another ambiguity encountered by optical character recognition algorithms is whether white space between two characters in a string of characters is mere kerning between the characters in a word or a word separator. All characters in a typeset document are separated by white space. Within a word, the white space between characters is called kerning and is put there to give the characters and the word a visually pleasing appearance. Typically, the kerning between characters in a word is less than 1/20 of an em in length. (An em is a unit of typeset distance, and is roughly equal to the width of the letter 'M' in a given font and point size.) Between words, the white space in a document is called a blank space, or simply a space. Typically, blank spaces are ½ an em in length, or larger. When an optical character recognition algorithm encounters a string of characters where two or more characters in the string are separated by one or more white spaces too big to be unambiguously kerning (greater than 1/20 of an em), yet too small to be unambiguously blank spaces (smaller than ½ an em), the algorithm must correctly resolve each white space into kerning or blank space to correctly group the character string into one or more words, as appropriate.

SUMMARY

The invention discloses a computer program for creating an electronic dictionary from an electronic document and using the dictionary to resolve ambiguous words in the document, where ambiguous words are words having one or more ambiguous characters or typesetting placeholders. The program receives an electronic document, searches the document for unambiguous words or words that do not contain one or more ambiguous characters or typesetting placeholders, and adds the unambiguous words to a dictionary of unambiguous words. In one implementation the dictionary is initially empty and is filled with the words of the received document. In another implementation, the dictionary is a commercial electronic dictionary to which the unambiguous words are added.

The program searches the received document a second time for ambiguous words or words that do contain one or more ambiguous characters or typesetting placeholders. A set of candidate solutions is created for each ambiguous word by resolving the ambiguous characters in the word. Each member of the set of candidate solutions corresponds to a unique resolution of the word's ambiguous characters, and the set of candidate solutions corresponds to all possible combinations of unique ambiguous character resolutions in the word. Depending on the number, type, and method of resolving the ambiguous characters in the word, each member of the set of candidate solutions can consist of a single character string or of multiple character strings. Some or all of the character strings in any member of the candidate solution set may or may not be words in the application's dictionary.

For each ambiguous word, the program searches its dictionary for matches to each member of the candidate solution set created for that word. For a member of the candidate solution set to match the dictionary search, each character string in the candidate solution set member must be found in the dictionary. Thus, when a candidate solution set member contains multiple character strings, each string must be found in the dictionary for the member to match the dictionary search. When only a single candidate solution set member matches the dictionary search, the program resolves the ambiguous characters occurring in the ambiguous word in conformity with the unique resolution used to create the single matching candidate solution set member. When no candidate solution set member matches the dictionary search, the program prompts a user to manually resolve the ambiguous word. In one implementation, the program prompts the user by presenting the user with all possible ambiguity resolutions, i.e., by presenting the user with each member of the set of candidate solutions. When the user responds to the prompt, e.g., by accepting a candidate solution set member, the program resolves the ambiguous characters occurring in the ambiguous word in conformity with the unique resolution used to create the accepted member of the candidate solution set.

When more than one candidate solution set member matches the dictionary search, the program checks whether the user prefers the candidate solution set member containing the largest word, the smallest word, the most words, or the fewest words. In one implementation, the user's preference is determined from a preference file. In another implementation, the user's preference is determined by prompting the user to indicate whether the user wishes to selected the candidate solution set member containing the largest word, the smallest word, the most words, or the fewest words. If the user prefers not to select the candidate solution containing the largest word, the smallest word, the most words, or the fewest words, the program prompts the user to resolve the ambiguous word and resolves the ambiguous word according to the user's resolution as described above. Conversely, if the user prefers to select the candidate solution containing the largest word, the smallest word, the most words, or the fewest words, the program resolves the ambiguous characters occurring in the ambiguous word in conformity with the unique resolution used to create the candidate solution set member respectively having the largest word, the smallest word, the most words, or the fewest words.

As ambiguous words are resolved, the program outputs the resolved word or words, and adds them to its dictionary. In one implementation, the resolved word or words are output by writing them to an output file. In another implementation, the resolved word or words are output by writing them to computer memory. When the program has resolved all of the ambiguous words in a document, it writes its dictionary to an output file. The dictionary can be used as a starting dictionary to which newly encountered words in a new document are added as the new document is processed.

The program allows ambiguous words in a received electronic document to be resolved without having to access a commercial electronic reference dictionary by creating and filling a dictionary with unambiguous words from the document being processed. The program thus uses the document itself as its own dictionary. In doing so, the program allows ambiguous characters or typesetting placeholders in technical, medical, or foreign language words to be resolved without having to access specialized technical, medical, or foreign language dictionaries.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
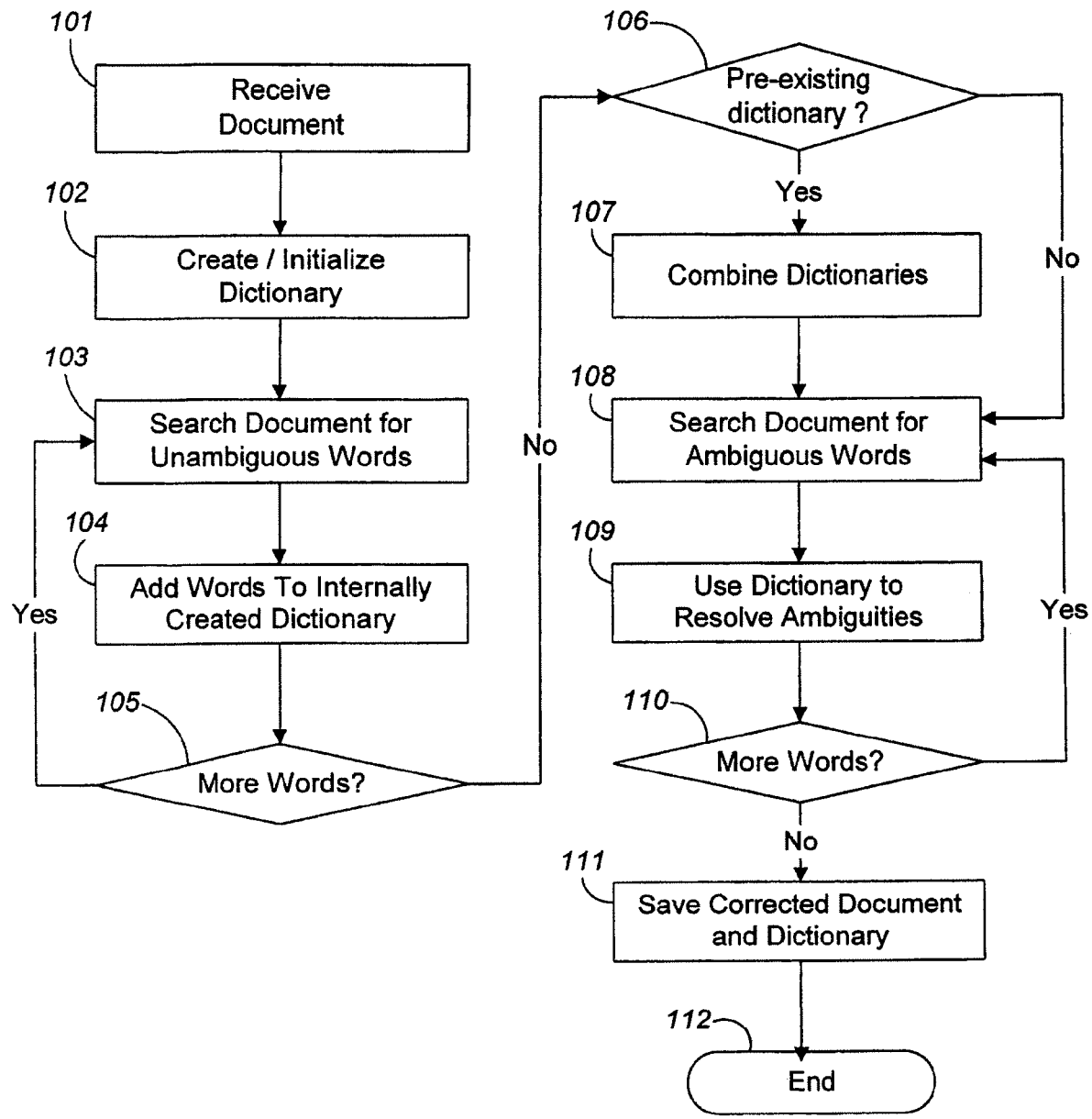
FIG. 1 is a flow chart depicting a method for creating an electronic dictionary from an electronic document.

An application capable of creating an electronic dictionary from an electronic document, and of using that dictionary to resolve ambiguous words in the electronic document is depicted in FIG. 1. The application receives an electronic document (step 101), and then creates and initializes a dictionary (step 102). Next, the application loops through the received document (steps 103-105), and searches for unambiguous words in the document (step 103) which it automatically adds to its dictionary (step 104), until all of the words in the document have been considered (step 105). The application considers a word unambiguous if the word does not contain any ambiguous characters or typesetting placeholders. Typesetting placeholders are symbols, characters, or commands which are put in a document to format the document or parts of the document, but which are not substantive parts of the document. Examples of typesetting placeholders include, but are not limited to, spaces, hyphens, commas, tabs, and end-of-line characters.

The application allows ambiguous words in a received document to be resolved without accessing a commercial electronic reference dictionary by filling its internally created dictionary with unambiguous words from the document being processed. In doing so, the application allows ambiguous typesetting placeholders in technical, medical, or foreign language words to be resolved without having access to specialized technical, medical, or foreign language dictionaries.

Once the application has searched the received document and automatically added all non-ambiguous words to its dictionary (steps 103-105), it checks whether it has access to a pre-existing dictionary (step 106). If it does, the application adds the contents of the pre-existing dictionary to its internally created dictionary (step 107). The pre-existing dictionary may be a pre-existing commercial electronic dictionary, or it may be a pre-existing electronic dictionary created by the application from one or more previously processed electronic documents.

With the full electronic dictionary, the application loops through the received document a second time (steps 108-110), and searches for ambiguous words (step 108) which it resolves and corrects using its dictionary (step 109). The second loop through the document terminates when all of the words in the document have been considered (step 110). The application considers a word ambiguous (step 108) if the word contains one or more ambiguous typesetting placeholders. For example, the application considers a word containing a hyphen at the end of a line ambiguous since the hyphen can be either a hard hyphen belonging to and separating the parts of a compound word, or a soft hyphen dividing the word across two lines by its syllables. Once the application has found (step 108), resolved and corrected (step 109) all of the ambiguous words in the received document, it saves the corrected electronic document and its internally created dictionary (step 110), and ends processing (step 111).

Figure 2:
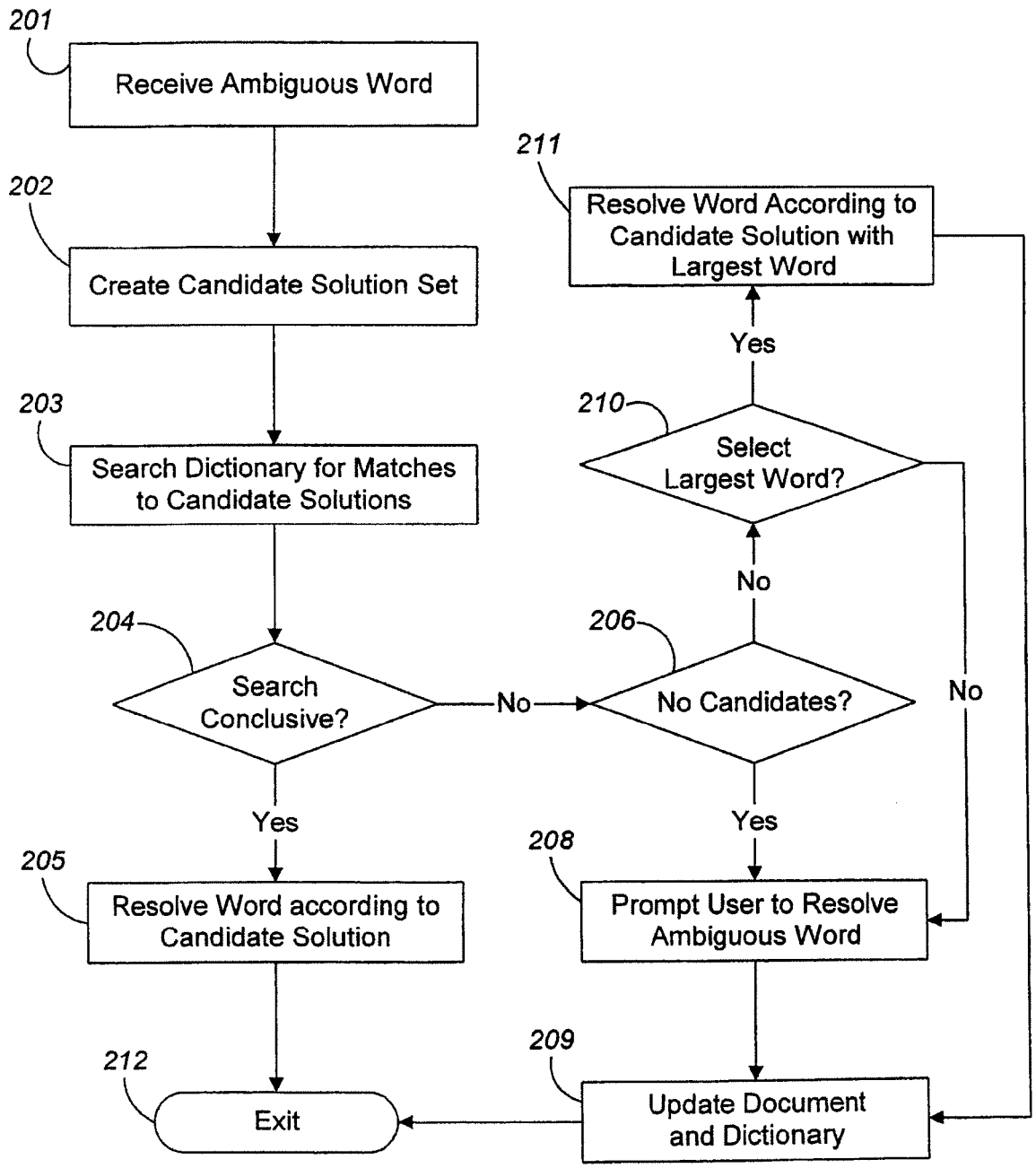
FIG. 2 is a flow chart depicting a method for resolving ambiguous characters in an electronic document using the document as its own dictionary.

When the application finds an ambiguous word (step 108), it uses its dictionary to resolve and correct the word's ambiguities according to the method depicted in FIG. 2. For each word containing one or more ambiguous characters or typesetting placeholders (step 201), the application creates a complete set of candidate solutions (step 202). A candidate solution for an ambiguous word is created by resolving the one or more ambiguous characters or typesetting placeholders occurring in the word. Depending on the number and type of ambiguous typesetting placeholders in the word, and the method of resolving them, the candidate solution can consist of a single character string or of multiple character strings. Some or all of the character strings in a candidate solution may or may not be words in the application's dictionary. A complete set of candidate solutions for an ambiguous word is created by resolving the one or more ambiguous typesetting placeholders occurring in the ambiguous word in all possible ways.

Figure 3A:
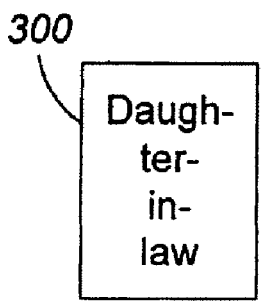
FIG. 3A is a schematic illustration showing the construction of a set of candidate solutions for an ambiguous word.
Figure 3A:
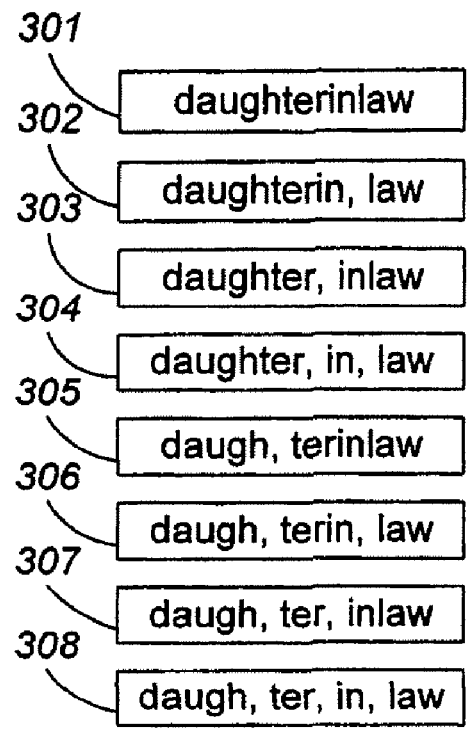

For example, consider the word daughter-in-law as it is written in a small text box 300 in FIG. 3A, where a word processing algorithm has ambiguously hyphenated the word to fit within text box 300. A candidate solution is created for the word by separately resolving each of the three hyphens occurring in the word. Since each hyphen in daugh-ter-in-law is binary-resolvable, i.e., since each hyphen can be resolved in one of two ways as either a hard hyphen or as a soft hyphen, the set of three hyphens in the word can be resolved in eight different ways, yielding a set of candidate solutions containing eight members.

For example, one candidate solution is created by resolving all three hyphens as soft hyphens. That solution consists of the single character string daughterinlaw, shown as candidate solution 301 in FIG. 3A. Another candidate solution is created by resolving all three hyphens as hard hyphens. That solution consists of the four character strings daugh, ter, in, and law shown as candidate solution 308 in FIG. 3A. If all three hyphens in daugh-ter-in-law really are hard hyphens, each of the four character strings in candidate solution 308 ought to be found as a word in the application's dictionary since by definition hard hyphens separate compound words. The complete set of candidate solutions for the ambiguously hyphenated word daugh-ter-in-law is shown in FIG. 3A, and consists of the eight candidate solutions 301-308.

Figure 3B:
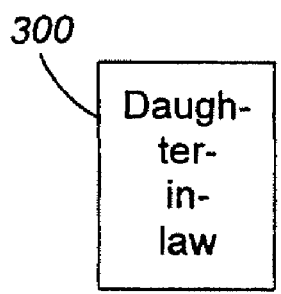
FIG. 3B is a schematic illustration showing the construction of an alternative set of candidate solutions for the ambiguous word of FIG. 3A.
Figure 3B:
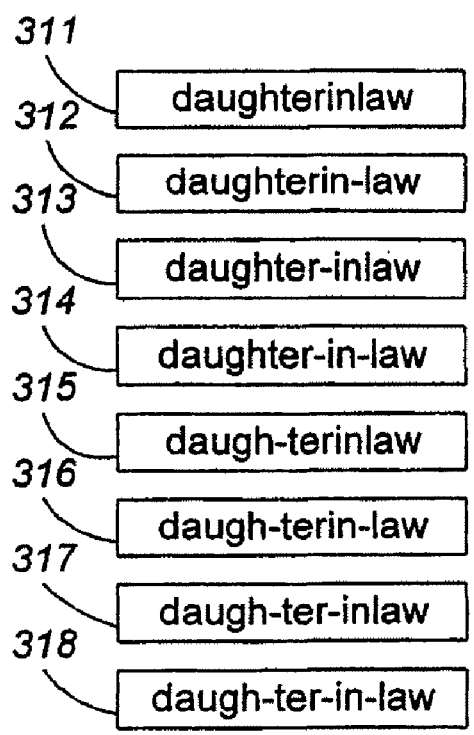

An alternative set of candidate solutions for the ambiguously hyphenated word daugh-ter-in-law is shown in FIG. 3B as candidate solutions 311-318. In FIG. 3B, each candidate solution is obtained by uniquely resolving each of the three hyphens in daugh-ter-in-law, as before. However, whereas the candidate solutions in FIG. 3A were created by separating candidate character strings containing hard hyphens into their component strings, all candidate solutions in FIG. 3B are created as single character strings, some of which contain hard hyphens. Thus, for example, where the three hyphens in daugh-ter-in-law are resolved as soft, hard, and soft hyphens, respectively, candidate solution 303 in FIG. 3A contains the two candidate character strings daughter and inlaw, whereas corresponding alternative candidate solution 313 in FIG. 3B contains the single candidate character string daughter-inlaw.

Once the application has created the set of candidate solutions for an ambiguous word (step 202), it loops through the candidate solution set, and searches its dictionary for matches to each candidate solution set member (step 203). For a candidate solution set member to match the dictionary search, each character string in the candidate solution set member must be found in the dictionary. Thus, in FIG. 3A, candidate solution set member 301 will not match a dictionary search since the character string daughterinlaw will not be found in any dictionary. Similarly, candidate solution set member 302 will not match a dictionary search since the character string daughterin will not be found in any dictionary, although the character string law will be. The only candidate solution set member in FIG. 3A which will match a dictionary search is solution 304 since each of the candidate character strings daughter, in, and law, will be found in the dictionary.

If only a single candidate solution set member matches the dictionary search, the search is deemed conclusive. The application checks whether a candidate solution set search is conclusive (step 204). If it is, the application resolves the ambiguous typesetting placeholders occurring in the ambiguous word according to the unique resolution used to create the single matching candidate solution set member (step 205), then exits (step 212). For example, assuming the words daughter, in, and law were used elsewhere in the received document, candidate solution set member 304 in FIG. 3A would be a conclusive solution to the ambiguously hyphenated word daugh-ter-in-law, since it is the only solution set member that would match the dictionary search as described above. Thus, the application would resolve daugh-ter-in-law by resolving the three hyphens in the word to conform to the unique resolutions used to create candidate solution set member 304. That is, it would respectively resolve the hyphens as soft, hard, and hard hyphens to obtain the word daughter-in-law.

If the dictionary search is inconclusive (step 204), it could be inconclusive because no candidate solution set member matched the dictionary search, or because more than one candidate solution set member matched the dictionary search. If no candidate solution set member matched the dictionary search (step 206), the application prompts a user to manually resolve the ambiguous word (step 208). In one implementation, the application prompts the user by presenting the user with all possible ambiguity resolutions, i.e., by presenting the user with each of the solutions in the set of candidate solutions. When the user responds to the prompt, e.g., by accepting a candidate solution set member, the application receives the user resolution and updates both the received document and the application's dictionary with the resolved word or words (step 209), before exiting (step 212).

If the dictionary search result is inconclusive because more than one candidate solution set member matched the search (step 206), the application checks whether the user prefers the candidate solution set member containing the largest word (step 210). The user's preference can be pre-determined from a preference file, or can be determined by prompting the user at step 210 to indicate whether the user wishes to select the candidate solution set member containing the largest matching word. If the user prefers not to select the candidate solution set member containing the largest matching word (step 210), the application prompts the user to resolve the ambiguous word (step 208), as described above. If the user prefers to select the candidate solution set member containing the largest matching word (step 210), the application resolves the ambiguous typesetting placeholders in conformity with the resolution used to create the candidate solution set member having the largest matching word (step 211). The application then updates the received document with the resolved word or words, and adds them to its dictionary (step 209), before exiting (step 212).

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

A number of embodiments of the invention have been described. Nevertheless, it will be understood that various modifications may be made without departing from the spirit and scope of the invention. For example, while the invention has been described in terms of resolving the ambiguously hyphenated word daugh-ter-in-law, it can obviously be used to resolve other ambiguously hyphenated words containing one or more ambiguous hyphens.

The invention can be used to resolve words that are ambiguous because they contain other ambiguous typesetting placeholders like ambiguous amounts of white space between characters, or ambiguous tabs or end-of-line characters. For example, the invention can be used to resolve the ambiguously separated word, car pool, into either the two words car and pool separated by an appropriate amount of blank space, or the single word carpool separated by an appropriate amount of kerning. The invention can be used to separate words containing one or more combinations of ambiguous typesetting placeholders, such as a word containing both ambiguous hyphens and ambiguous white space between characters.

Some or all of the steps described in the invention may be eliminated, or may be performed in a different order than has been described. For example, step 107 could be eliminated and the invention could be used without adding the contents of a pre-existing dictionary to the dictionary created by the application from the document being processed. Or the order of steps 102-105 and steps 106-107 could be reversed, so that the application starts with a pre-existing dictionary and automatically adds unambiguous words to the dictionary from the document being processed.

While the invention has been described as resolving an ambiguous word resulting in a dictionary search matching more than one candidate solution set members by selecting the candidate solution set member containing the largest word, it can also be implemented to resolving the ambiguous word by selecting the candidate solution set member containing the smallest word, the most words, or the fewest words.

While the method has been described as a step to resolve character ambiguities encountered in an optical character recognition process run on scanned documents, the method can also be used on its own or in conjunction with other applications to resolve character ambiguities. For example, the method can be used to resolve character ambiguities in an electronic document created by sending the output of a word processing program through a printer driver and directly to an alternatively formatted electronic document. For example, the method can be used to resolve character ambiguities created by sending the output of a word processing program through the PDFWriter© printer driver available from Adobe Systems Incorporated of San Jose, Calif., to a document formatted in the Portable Document Format. These and other implementations are within the scope of the following claims.

What is claimed is:

1. A computer-implemented method for classifying an end-of-line hyphen as either a soft-hyphen that has been inserted into the word for typesetting purposes or a hard-hyphen that belongs in the word, comprising:
    performing in a computer programmed to perform particular functions pursuant to instructions from program software operations comprising:
        searching a document for a word that contains an end-of-line hyphen;
        creating a solution set for the word containing the end-of-line hyphen, wherein each solution in the solution set is obtained by identifying the end-of-line hyphen as either a soft-hyphen that has been inserted into the word for typesetting purposes or a hard-hyphen that belongs in the word, wherein the solution set is stored in memory of a computer system;
        searching a dictionary for each solution in the solution set; and
        using the results from the dictionary search to identify the end-of-line hyphen as either a soft-hyphen or a hard-hyphen.

2. The computer-implemented method of claim 1, wherein the result of the dictionary search is to find only one solution in the solution set, the method further comprising:
    identifying the end-of-line hyphen in conformity with the solution found in the dictionary search.

3. The computer-implemented method of claim 1, wherein the result of the dictionary search is to find none of the solutions in the solution set, the method further comprising:
    prompting a user to manually identify the end-of-line hyphen as either a soft-hyphen or a hard-hyphen.

4. The computer-implemented method of claim 1, wherein the result of the dictionary search is to find more than one solution in the solution set, the method further comprising:
    prompting a user to manually resolve the end-of-line hyphen as either a soft-hyphen or a hard-hyphen.

5. The computer-implemented method of claim 1, wherein the result of the dictionary search is to find more than one solution in the solution set, the method further comprising:
    identifying the end-of-line hyphen in conformity with that solution containing the longest word.

6. The computer-implemented method of claim 1, further comprising:
    identifying one or more words in the document that do not contain an end-of-line hyphen; and
    automatically adding the one or more words that do not contain an end-of-line hyphen to the dictionary.

7. An apparatus comprising:
    a processor;
    a storage device coupled to the processor and storing instructions, which, when executed by the processor, cause the processor to perform operations comprising:
        searching a document for a word that contains an end-of-line hyphen;
        creating a solution set for the word containing the end-of-line hyphen, wherein each solution in the solution set is obtained by identifying the end-of-line hyphen as either a soft-hyphen that has been inserted into the word for typesetting purposes or a hard-hyphen that belongs in the word;

searching a dictionary for each solution in the solution set; and using the results from the dictionary search to identify the end-of-line hyphen as either a soft-hyphen or a hard-hyphen.

8. The apparatus of claim 7, wherein the result of the dictionary search is to find only one solution in the solution set, the storage device further storing instructions which, when executed by the processor, cause the processor to perform operations comprising:

identifying the end-of-line hyphen in conformity with the solution found in the dictionary search.

9. The apparatus of claim 7, wherein the result of the dictionary search is to find none of the solutions in the solution set, the storage device further storing instructions which, when executed by the processor, cause the processor to perform operations comprising:

prompting a user to manually identify the end-of-line hyphen as either a soft-hyphen or a hard-hyphen.

10. The apparatus of claim 7, wherein the result of the dictionary search is to find more than one solution in the solution set, the storage device further storing instructions which, when executed by the processor, cause the processor to perform operations comprising:

prompting a user to manually resolve the end-of-line hyphen as either a soft-hyphen or a hard-hyphen.

11. The apparatus of claim 7, wherein the result of the dictionary search is to find more than one solution in the solution set, the storage device further storing instructions which, when executed by the processor, cause the processor to perform operations comprising:

identifying the end-of-line hyphen in conformity with that solution containing the longest word.

12. The apparatus of claim 7, the storage device further storing instructions which, when executed by the processor, cause the processor to perform operations comprising:

identifying one or more words in the document that do not contain an end-of-line hyphen; and automatically adding the one or more words that do not contain an end-of-line hyphen to the dictionary.

* * * * *